Jan. 4, 1949.   C. E. CLAPPER   2,457,976
TRACTOR HITCH
Filed Feb. 10, 1947
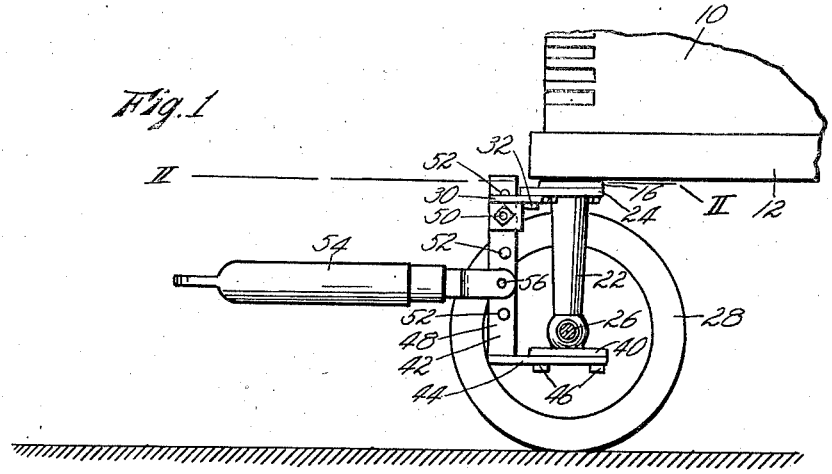
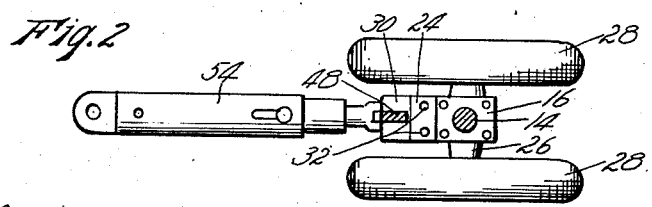
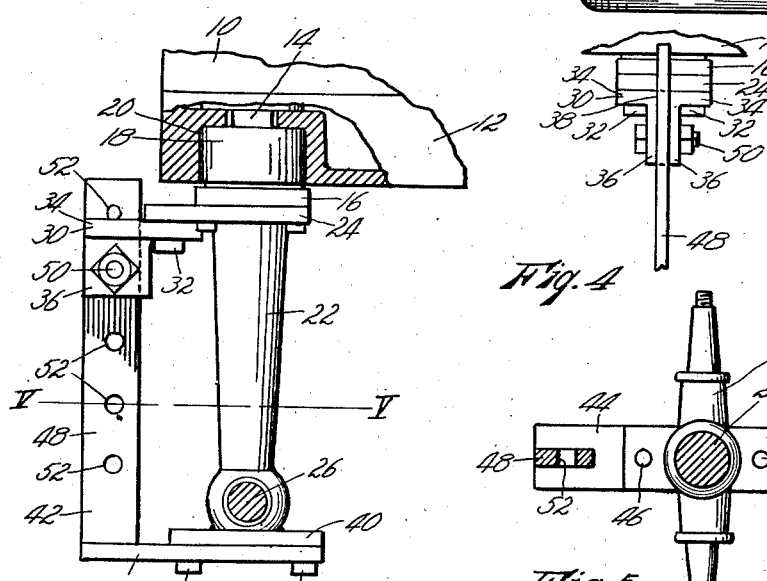
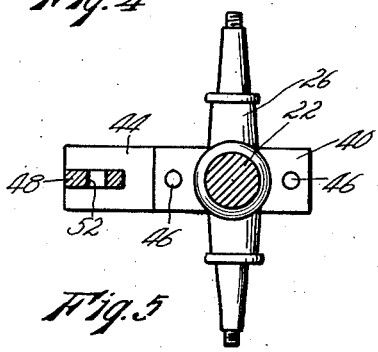
INVENTOR,
Clyde E. Clapper.
BY
Roy E. Hamilton,
Attorney.

Patented Jan. 4, 1949

2,457,976

UNITED STATES PATENT OFFICE 2,457,976

TRACTOR HITCH

Clyde E. Clapper, Kansas City, Mo.

Application February 10, 1947, Serial No. 727,662

5 Claims. (Cl. 280—33.5)

This invention relates to new and useful improvements in a tractor hitch, and has particular reference to a tractor hitch suitable for drawing a tractor and steering the tractor to follow the towing vehicle.

The principal object of the present invention is the provision of a tractor hitch adapted to be rigidly carried by the pivotally carried front axle and related parts of a tractor whereby when the hitch is turned, the front axle will be pivoted to turn the front wheels of the tractor.

Another object is the provision of a tractor hitch adapted to be easily and rapidly mounted on or detached from the tractor.

Other objects are simplicity and economy of construction, ruggedness, dependability of operation, and adjustability to accommodate the hitch to towing vehicles having various hitch elevations.

With these objects in view, as well as other objects which will appear during the course of the specification, reference will be had to the drawing, wherein:

Figure 1 is a fragmentary side elevation, partially broken away, of the forward portion of a tractor showing a tractor hitch embodying the present invention attached thereto.

Fig. 2 is a horizontal section taken on line II—II of Figure 1.

Fig. 3 is an enlarged fragmentary side elevation, partially broken away, of the forward portion of a tractor showing the tractor hitch attached thereto, with the drawbar removed.

Fig. 4 is an enlarged fragmentary front elevation of the tractor hitch attached to the tractor.

Fig. 5 is a horizontal section taken on line V—V of Figure 3.

Like reference numerals apply to similar parts throughout the several views, and the numeral 10 applies to a tractor having a frame 12 and a vertical steering shaft 14 extending beneath said frame. Said shaft is equipped at its lower end with an outwardly extending flange 16. A thrust bearing 18 carried between said flange and socket 20 formed in tractor frame 12, supports the weight of the forward end of the tractor. A downwardly extending solid stem 22 has an outwardly extending flange 24 at its upper end, said flange being rigidly fixed to flange 16 of steering shaft 14. A horizontal axle 26 is rigidly fixed at its midpoint to the lower end of stem 22. A ground engaging wheel 28 is carried for rotation on each end of said axle.

Flange 24 of stem 22 is extended forwardly, and to the extended portion thereof a forwardly extending bifurcated member 30 is removably fixed by means of screws 32. The forward portion 34 of said bifurcated member is provided with depending wall portions 36 adjacent the bifurcation 38 thereof.

A horizontal member 40 extending substantially at right angles to axle 26 is rigidly fixed to the lower side of said axle at the midpoint thereof. In at least one popular tractor model, flange 26 and member 40 are supplied with the tractor by the manufacturer.

An angled hitch member 42 has its horizontal arm 44 removably fixed to member 40 by means of screws 46, and its vertically extending arm 48 passes through bifurcation 38 of member 30. A bolt 50 passes through walls 36 and through one of a plurality of vertically spaced holes 52 through vertical arm 48. By passing said bolt through others of said holes, the hitch may be accommodated to tractors having stems 22 of various lengths.

A drawbar 54 of any suitable type is adapted to be pivotally connected at its rearward end with vertical arm 48 by means of pin 56, said pin passing through any one of holes 52 in said vertical member. Said drawbar is adapted at its forward end to be attached to any vehicle suitable for towing the tractor. By passing pivot pin 56 through various of holes 52, drawbar 54 may be adapted to the elevation of the hitch connection of the towing vehicle, thereby maintaining said drawbar in a substantially horizontal position.

It is apparent that whenever the vehicle pulling the tractor by means of drawbar 54 turns, hitch member 42, being rigidly carried by stem 22 and axle 26, will cause said stem and axle to be pivoted about a vertical axis, and wheels 20 carried on said axle will be turned to cause the tractor to trail properly behind the towing vehicle. since a substantial portion of the load is transmitted through hitch member 42 and bifurcated member 30 to the upper end of stem 22, it is apparent that the possibility of damage caused by heavy loads or jerks on the lower end of said stem is greatly reduced. And since extended flange 24 and member 40 are supplied by the tractor manufacturer with tapped screw holes in at least one popular model tractor, the hitch may be mounted on and detached from the tractor with a minimum of time and difficulty.

The improvements I claim as new and desire to protect by Letters Patent are:

1. In combination with a tractor having a front axle carried by a rotatable vertical steering stem extending downwardly from the frame of said tractor, a tractor hitch comprising a vertical member rigidly connected at its upper and lower ends with said stem, means for adjusting the effective vertical length of said member, and means for attaching a drawbar to said member, at a variable elevation thereon.

2. In combination with a tractor having a front axle rigidly carried by a rotatable vertical steering stem extending downwardly from the frame of said tractor, a tractor hitch comprising a flange fixed to said stem at the upper end thereof adjacent said tractor frame, a horizontal member fixed to said axle concentrically with said stem, a vertically disposed hitch member fixed at its lower end to said horizontal member and adjustably carried at its upper end by said flange, and means for attaching a drawbar to said vertical hitch member at an adjustable elevation thereon.

3. In combination with a tractor having a front axle rigidly carried by a rotatable vertically disposed steering stem extending downwardly from the frame of said tractor, a tractor hitch comprising a forwardly extending flange rigidly fixed to said stem adjacent the upper end thereof, a forwardly extending bifurcated member fixed to said flange, a horizontal member fixed to said axle at the lower end of said stem, and an angled hitch member having its horizontal leg removably fixed to said horizontal member, and its vertical leg being provided with a plurality of vertically spaced holes and extending upwardly through the bifurcation of said bifurcated member and adjustably fixed therebetween by means of a bolt passing through said bifurcated member and one of said holes.

4. In combination with a tractor having a front axle rigidly carried by a rotatable vertical steering stem extending downwardly from the frame of said tractor, a forwardly extending flange carried by said stem adjacent the upper end thereof, and a horizontal member carried by said axle at the lower end of said stem, of a tractor hitch comprising a vertical member spaced apart from said stem and carried at its upper and lower ends by said flange and said horizontal member respectively, means for adjusting the effective length of said hitch member, and means for attaching a drawbar to said hitch member at various elevations thereon.

5. In combination with a tractor hitch having a front axle rigidly carried by a rotatable vertical steering stem extending downwardly from the frame of said tractor, a forwardly extending flange carried by said stem adjacent the upper end thereof, and a horizontal member carried by said axle at the lower end of said stem, of a tractor hitch comprising a forwardly extending bifurcated member removably fixed to said flange, and an angled hitch member having a horizontal leg removably fixed to said horizontal member and a vertical leg parallel to and spaced apart from said stem and extending upwardly through the bifurcation and said bifurcated member, said vertical arm being adjustably fixed to said bifurcated member by means of a bolt passing through said bifurcated member and through one of a plurality of vertically spaced holes in said vertical hitch member, said vertical hitch member being adapted to mount a drawbar at various elevations thereon by means of a pivot pin inserted through another of said holes.

CLYDE E. CLAPPER.

REFERENCES CITED

The following references are of record in the file of this patent:

UNITED STATES PATENTS

| Number | Name | Date |
| --- | --- | --- |
| 2,208,601 | Ronning | July 23, 1940 |